(12) United States Patent
Jomori et al.

(10) Patent No.: US 9,910,055 B2
(45) Date of Patent: Mar. 6, 2018

(54) VIBRATION ANGULAR VELOCITY SENSOR

(71) Applicant: DENSO CORPORATION, Kariya, Aichi-pref. (JP)

(72) Inventors: Tomoya Jomori, Kariya (JP); Yoichi Mochida, Nagaokakyo (JP)

(73) Assignee: DENSO CORPORATION, Kariya (JP)

( * ) Notice: Subject to any disclaimer, the term of this patent is extended or adjusted under 35 U.S.C. 154(b) by 336 days.

(21) Appl. No.: 14/366,290

(22) PCT Filed: Dec. 20, 2012

(86) PCT No.: PCT/JP2012/008158
§ 371 (c)(1),
(2) Date: Jun. 18, 2014

(87) PCT Pub. No.: WO2013/094208
PCT Pub. Date: Jun. 27, 2013

(65) Prior Publication Data
US 2014/0360265 A1 Dec. 11, 2014

(30) Foreign Application Priority Data
Dec. 23, 2011 (JP) ................................ 2011-282475

(51) Int. Cl.
*G01C 19/5747* (2012.01)
*G01P 3/14* (2006.01)
*G01P 3/44* (2006.01)

(52) U.S. Cl.
CPC ............ *G01P 3/14* (2013.01); *G01C 19/5747* (2013.01); *G01P 3/44* (2013.01)

(58) Field of Classification Search
CPC ................................................. G01C 19/5747
USPC .......................................................... 73/504.12
See application file for complete search history.

(56) References Cited

U.S. PATENT DOCUMENTS

| 6,065,339 | A  | 5/2000 | Takeuchi et al. |
|-----------|----|--------|-----------------|
| 6,244,110 | B1 | 6/2001 | Takeuchi et al. |
| 6,378,369 | B1 | 4/2002 | Takata et al.   |
| 2001/0011479 | A1 | 8/2001 | Takeuchi et al. |
| 2003/0131664 | A1 | 7/2003 | Mochida et al.  |
| 2005/0066726 | A1 | 3/2005 | Mochida         |
| 2010/0300203 | A1 | 12/2010 | Gotoh          |

FOREIGN PATENT DOCUMENTS

WO       2009/060531 A1     5/2009

OTHER PUBLICATIONS

International Search Report and Written Opinion of the International Searching Authority dated Feb. 5, 2013 for the corresponding international application No. PCT/JP2012/008158 (with English translation).
Office Action dated Aug. 4, 2015 issued in corresponding JP patent application No. 2011-282475 (and English translation).

*Primary Examiner* — John Chapman, Jr.
(74) *Attorney, Agent, or Firm* — Posz Law Group, PLC

(57) ABSTRACT

A vibration angular velocity sensor includes a substrate and a vibrator. The vibrator includes support members, linear drive beams, and a plurality of weight portions connected by the drive beams. The vibrator vibrates the plurality of weight portions by bending of the drive beams. The vibrator is fixed to the substrate through the support members at fixed points of the drive beam. A spring property of the support members is smaller than a spring property of the drive beams.

6 Claims, 9 Drawing Sheets

VIBRATION ANGULAR VELOCITY SENSOR

CROSS REFERENCE TO RELATED APPLICATION

This application is a U.S. national stage application of PCT/JP2012/008158 filed on Dec. 20, 2012 and is based on Japanese Patent Application No. 2011-282475 filed on Dec. 23, 2011, the contents of which are incorporated herein by reference.

TECHNICAL FIELD

The present disclosure relates to a vibration angular velocity sensor.

BACKGROUND ART

A vibration angular velocity sensor is suggested in JP-A-2006-163376 (corresponding to US 2003/013164A1). The angular velocity sensor has a structure in which two drive weights each having a detection weight therein (hereafter, referred to as inner drive weights) are arranged, and drive weights (hereafter, referred to as outer drive weights) are disposed at both outsides to sandwich the two drive weights, the four drive weights are connected by drive beams, and the drive beams are fixed to a fixed section with support members having a Y-shape.

SUMMARY OF INVENTION

Technical Problem

In order to increase a sensitivity of an angular velocity sensor having the above-described structure, it can be considered that a resonance frequency is decreased by decreasing a width of beams connecting each of weights. However, the inventors found that the following problem occurs when the resonance frequency is decreased. The problem will be described with reference to FIG. 8 and FIG. 9.

FIG. 8 and FIG. 9 are schematic diagrams showing states of an angular velocity sensor during vibration. FIG. 8 illustrates a state in which outer drive weights and inner drive weights are driven normally (hereafter, a form in this state is referred to as a drive mode form). FIG. 9 illustrates a state in which the outer drive weights and the inner drive weights are vibrated in an undesirable vibration mode which is unexpected (hereafter, a form in this state is referred to as an unnecessary vibration mode form).

A vibration angular velocity sensor includes outer drive weights J1, J2 and inner drive weights J3, J4 as a movable section. The vibration angular velocity sensor is driven when an AC voltage (alternating-current voltage) is applied between fixed electrodes J5 disposed opposite to the outer drive weights J1, J2 and the outer drive weights J1, J2 and the inner drive weights J3, J4, thereby generating electrostatic attraction forces between comb-shaped electrodes J1a, J2a, J3a, J4a, J5a. During the normal drive, a frequency of the AC voltage is set to be a drive reference frequency fd, as illustrated in FIG. 8, the adjacent outer drive weights J1, J2 and inner drive weights J3, J4 are applied with driving forces in opposite directions to each other and are vibrated in opposite directions in the vertical direction of a paper surface. Thus, the two inner drive weights J3, J4 are vibrated with opposite phases in the vertical direction of the paper surface and become the drive mode form. However, when the frequency of the AC voltage becomes a predetermined frequency fr, as illustrated in FIG. 9, the adjacent inner drive weights J3, J4 are vibrated with the same phase in the vertical direction of the paper surface and become the unnecessary vibration mode form (hereafter, this frequency is referred to as an unnecessary mode frequency).

In a pattern shape of a conventional angular velocity sensor, as illustrated in FIG. 10A, the drive resonance frequency fd becomes 15.2 kHz, and a difference Δfr with the unnecessary mode frequency fr becomes 1.5 kHz, which is a large value of about 10% of the drive resonance frequency. Thus, in a circuit processing, the drive resonance frequency fd and the unnecessary mode frequency fr can be discriminated. However, when a width of a drive beam J6 is decreased to increase the sensitivity, as illustrated in FIG. 10B, the drive resonance frequency fd approaches the unnecessary mode frequency fr. If this phenomenon occurs, when the drive resonance frequency fd is detected in the circuit processing, there may be a problem that the unnecessary mode frequency fr generated in the unnecessary vibration mode is detected by error, and a malfunction occurs.

Specifically, when the vibration angular velocity sensor is driven, displacements of the outer drive weights J1, J2 are monitored while changing the frequency of the AC voltage to detect the drive resonance frequency fd. For example, monitor electrodes are disposed opposite to the outer drive weights J1, J2, and the displacements of the outer drive weights J1, J2 are detected based on change in capacity generated therebetween. At the time, a frequency when a capacity change is large is detected as the drive resonance frequency fd. However, the capacity change is large also at the unnecessary mode frequency fr. Thus, when the unnecessary mode frequency fr is too close to the drive resonance frequency fd, the state at the unnecessary mode frequency is erroneously detected as the state at the drive resonance frequency fd, and the vibration angular velocity sensor is erroneously driven with the unnecessary vibration mode.

In view of the foregoing problems, it is an object of the present disclosure to provide a vibration angular velocity sensor that can increase a sensitivity of a sensor without causing a malfunction.

Solution to Problem

A vibration angular velocity sensor according to an aspect of the present disclosure includes a substrate and a vibrator. The vibrator includes support members, linear drive beams, and a plurality of weight portions connected by the drive beams. The vibrator vibrates the weight portions by bending of the drive beams and is fixed to the substrate through the support members at fixed points of the drive beams. A spring property of the support members is set to be smaller than a spring property of the drive beams.

By setting the spring property of the support member to be smaller than the spring property of the drive beam as described above, an erroneous detection of detecting the unnecessary mode frequency fr as the drive resonance frequency fr can be restricted, and a malfunction can be restricted. Thus, the vibration angular velocity sensor can increase a sensitivity of a sensor without causing a malfunction.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
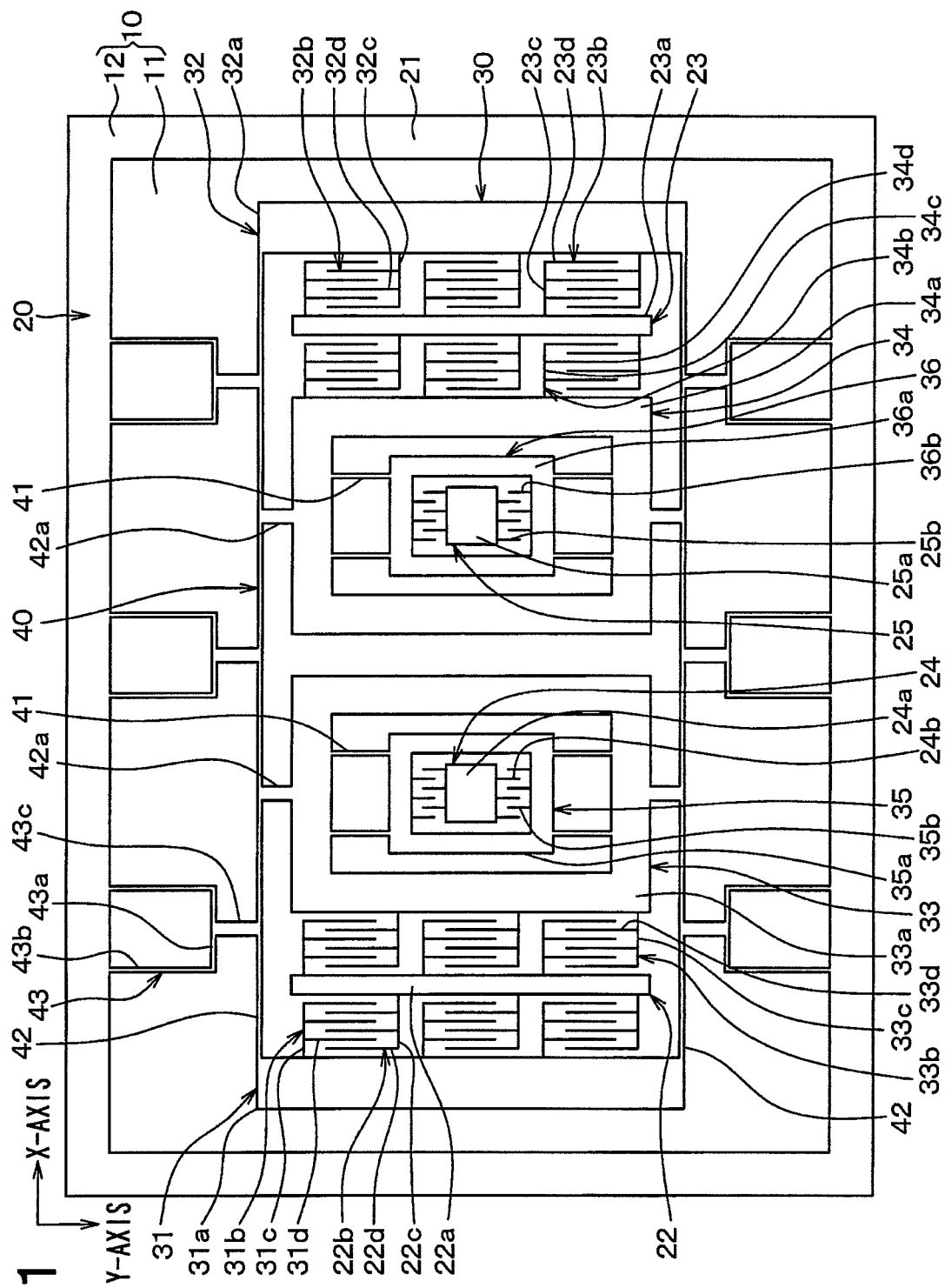
FIG. 1 is a plan view illustrating a vibration angular velocity sensor according to a first embodiment of the present disclosure.

The following describes embodiments of the present disclosure with reference to the drawings. In each of the following embodiments, the same reference number is given to the same or equivalent parts in the drawings.

First Embodiment

A first embodiment of the present disclosure will be described. A vibration angular velocity sensor (gyro sensor) described in the present embodiment is a sensor for detecting an angular velocity as a physical quantity and is used, for example, for detecting a rotation angular velocity around a center line parallel to a vertical direction of the vehicle. However, the vibration angular velocity sensor can be definitely applied to something other than the vehicle.

The following describes the vibration angular velocity sensor according to the present embodiment with reference to FIG. 1.

The vibration angular velocity sensor is mounted in a vehicle in such a manner that a normal direction of a paper surface of the FIG. 1 corresponds to the vertical direction of the vehicle. The vibration angular velocity sensor is formed to one surface side of a substrate 10 having a plate shape. The substrate 10 is made of a silicon on insulator (SOI) substrate in which a support substrate 11 and a semiconductor layer 12 sandwich a buried oxide layer which is not illustrated and becomes a sacrifice layer. A sensor structure described above is formed by partially removing the buried oxide layer after etching the semiconductor layer 12 side to a pattern of the sensor structure so that a part of the sensor structure is released to be a floating state.

In the following description, one direction on a plane parallel to a surface of the semiconductor layer 12 and a horizontal direction of the paper surface is referred to as an X-axis direction, a vertical direction of the paper surface perpendicular to the X-axis direction is referred to as a Y-axis direction, and the direction perpendicular to the surface of the semiconductor layer 12 is referred to as a Z-axis direction.

The semiconductor layer 12 is patterned into a fixed section 20, a movable section 30, and a beam section 40. The buried oxide layer remains on at least a part of a rear surface of the fixed section 20. The fixed section 20 is not released from the support substrate 11 and is fixed to the support substrate 11 through the buried oxide layer. The movable section 30 and the beam section 40 form a vibrator in the vibration angular velocity sensor. The buried oxide layer is removed from a rear surface side of the movable section 30. The movable section 30 is released from the support substrate 11 to be a floating state. The beam section 40 supports the movable section 30 and displaces the movable section 30 in the X-axis direction and the Y-axis direction to detect an angular velocity. Specific structures of the fixed section 20, the movable section 30, and the beam section 40 will be described.

The fixed section 20 includes a support fixed portion 21 for supporting the movable section 30, drive fixed portions 22, 23 applied with drive voltage, and detection fixed portions 24, 25 used for the angular velocity detection.

The support fixed portion 21 is disposed to surround a sensor structure such as other portions in the fixed section 20 (the drive fixed portions 22, 23 and the detection fixed portions 24, 25) and the movable section 30. The support fixed portion 21 supports the movable section 30 through the beam section 40 on inner walls. Here, a structure in which the support fixed portion 21 surrounds the whole periphery of the sensor structure is taken as an example. However, a structure in which the support fixed portion 21 is formed only at a part of the periphery of the sensor structure may also be employed.

The drive fixed portions 22, 23 include the drive fixed portion 22 disposed between an outer drive weight 31 and an inner drive weight 33 and the drive fixed portion 23 disposed between an outer drive weight 32 and an inner drive weight 34 as described later. The drive fixed portions 22, 23 include base portions 22a, 23a and drive fixed electrodes 22b, 23b having comb-shapes.

The base portions 22a, 23a extend in the Y-axis direction. The base portions 22a, 23a are connected with a plurality of drive fixed electrodes 22b, 23b. The base portions 22a, 23a can be applied with an AC voltage (the drive voltage) from outside through bonding wires connected to bonding pads which are not illustrated and are provided to the base portions 22a, 23a. When a desired AC voltage is applied to the base portions 22a, 23a, the desired AC voltage is also applied to each of the drive fixed electrodes 22b, 23b.

The drive fixed electrodes 22b, 23b are comb-shaped electrodes disposed opposite to comb teeth of drive movable electrodes 31b, 32b, 33b, 34b having comb-shapes and provided to the outer drive weights 31, 32 and the inner drive weights 33, 34 as described later. Specifically, the drive fixed electrodes 22b, 23b have structures including a plurality of support portions 22c, 23c extending in the X-axis direction and a plurality of comb-shaped electrodes 22d, 23d respectively extending from the support portions 22c, 23c in the Y-axis direction, and the structures are arranged in the Y-axis direction on both sides of the base portions 22a, 23a in the horizontal direction of the paper surface.

The detection fixed portions 24, 25 are arranged in detection weights 35, 36 provided in the inner drive weights 33, 34 as described later. The detection fixed portions 24, 25 include base portions 24a, 25a and detection fixed electrodes 24b, 25b.

The base portions 24a, 25a are provided with bonding pads which are not illustrated, signals can be extracted outside from the base portions 24a, 25a through bonding wires connected to the bonding pads. The detection fixed electrodes 24b, 25b are plurality of comb-shaped electrodes extending in the Y-axis direction from the base portions 24a, 25a and disposed opposite to comb teeth of detection movable electrodes 35b, 36b having comb-shapes and provided to the detection weights 35, 36.

The movable section 30 displaces in accordance with an application of angular velocity and includes the outer drive weights 31, 32, the inner drive weights 33, 34, and the detection weights 35, 36. The movable section 30 has a layout in which the outer drive weight 31, the inner drive weight 33 incorporated with the detection weight 35, the inner drive weight 34 incorporated with the detection weight 36, and the outer drive weight 32 are arranged in this order in the X-axis direction.

The outer drive weights 31, 32 include the mass portions 31a, 32a and the drive movable electrodes 31b, 32b.

The mass portions 31a, 32a extend in the Y-axis direction. The mass portion 31a is disposed opposite to the base portion 22a of the drive fixed portion 22. The mass portion 32a is disposed opposite to the base portion 23a of the drive fixed portion 23. The outer drive weights 31, 32 are movable in the Y-axis direction using the mass portions 31a, 32a as weights.

The drive movable electrodes 31b, 32b are comb-shaped electrodes disposed opposite to comb teeth of the drive fixed electrodes 22b, 23b having the comb-shapes and provided to the drive fixed portions 22, 23. Specifically, the drive movable electrodes 31b, 32b have structures including a plurality of support portions 31c, 32c extending in the X-axis direction and a plurality of comb-shaped electrodes 31d, 32d respectively extending from the support portions 31c, 32c in the Y-axis direction, and the structures are arranged in the Y-axis direction on sides of the mass portions 31a, 32a adjacent to the drive fixed portions 22, 23.

The inner drive weights 33, 34 include mass portions 33a, 34a and the drive movable electrodes 33b, 34b.

The mass portions 33a, 34a have quadrangular frame shapes. The inner drive weights 33, 34 are movable in the Y-axis direction using the mass portions 33a, 34a as weights. In each of the mass portions 33a, 34a having the quadrangular shapes, two facing sides are parallel to the X-axis direction and the Y-axis direction, respectively. In the sides extending in the Y-direction, one side is disposed opposite to the base portion 22a, 23a of the drive fixed portion 22, 23. Specifically, in the sides of each of the mass portions 33a, 34a extending in the Y-axis direction, one side is disposed opposite to the base portion 22a, 23a of the drive fixed portion 22, 23, and the drive movable electrodes 33b, 34b are disposed on the side opposite to the base portions 22a, 23a.

The drive movable electrodes 33b, 34b are comb-shaped electrodes disposed opposite to comb-teeth of the drive fixed electrodes 22b, 23b having the comb shapes and provided to the drive fixed portions 22, 23. Specifically, the drive movable electrodes 33b, 34b have structures including a plurality of support portions 33c, 34c extending in the X-axis direction and a plurality of comb-shaped electrodes 33d, 34d respectively extending from the support portions 33c, 34c in the Y-axis direction, and the structures are arranged in the Y-axis direction on sides of the mass portions 33a, 34a adjacent to the drive fixed portions 22, 23.

The detection weights 35, 36 include mass portions 35a, 36a and the detection movable electrodes 35b, 36b.

The mass portions 35a, 36a have quadrangular frame shapes. The mass portions 35a, 36a are supported on inner walls of the inner drive weights 33, 34 through detection beams 41 in the beam section 40 described later. The detection weights 35, 36 are moved with the inner drive weights 33, 34 in the Y-axis direction. However, the detection weights 35, 36 are movable in the X-axis direction using the mass portions 35a, 36a as weights. The detection movable electrodes 35b, 36b are comb-shaped electrodes extending in the Y-axis direction from inner walls of the mass portions 35a, 36a. The detection movable electrodes 35b, 36b are disposed opposite to the comb teeth of the detection fixed electrodes 24b, 25b having the comb shapes and provided to the detection fixed portions 24, 25.

The beam section 40 includes the detection beams 41, the drive beams 42, and the support members 43. The detection beams 41 connect sides of inner walls of the mass portions 33a, 34a in the inner drive weights 33, 34 parallel to the X-axis direction and sides of outer walls of the mass portions 35a, 36a in the detection weights 35, 36 parallel to the X-axis direction. The detection beams 41 are movable in the X-axis direction. Thus, the detection weights 35, 36 are movable in the X-axis direction with respect to the inner drive weights 33, 34 based on the displacements of the detection beams 41.

The drive beams 42 connect the outer drive weights 31, 32 and the inner drive weights 33, 34 and enable the outer drive weights 31, 32 and the inner drive weights 33, 34 to move in the Y-axis direction. The outer drive weight 31, the inner drive weight 33, the inner drive weight 34, and the outer drive weight 32 are arranged in this order and are connected by the drive beams 42.

Specifically, the drive beams 42 are linear beams having a predetermined width in the Y-axis direction. In the vertical direction of the paper surface, the drive beams 42 are disposed one by one at both sides of the outer drive weights 31, 32 and the inner drive weights 33, 34 and are connected to the outer drive weights 31, 32 and the inner drive weights 33, 34. The drive beams 42 and the outer drive weights 31, 32 and the inner drive weights 33, 34 may be connected directly. However, for example, in the present embodiment, the drive beams 42 and the inner drive weights 33, 34 are connected through connection portions 42a.

The support members 43 support the outer drive weights 31, 32, the inner drive weights 33, 34, and the detection weights 35, 36. Specifically, the support members 43 are disposed between the inner wall surfaces of the support fixed portions 21 and the drive beams 42. The support members 43 support each of the weights 31-36 through the drive beams 42.

The support member 43 includes a rotation beam 43a, support beams 43b, and a connection portion 43c. The rotation beam 43a is a linear beam having a predetermined width in the Y-axis direction. On both sides of the rotation beam 43a, the support beams 43b are connected. At a center portion of the rotation beam 43a opposite from the support beams 43b, the connection portion 43c is connected. During the sensor driving, the rotation beam 43a waves and bends in an S-shape centering on the connection portion 43c. The support beams 43b connect the both sides of the rotation beam 43a to the support fixed portion 21. In the present embodiment, the support beams 43 are linear members. When an impact is applied, the support beams 43b allow each of the weights 31-36 to move in the X-axis direction. The connection portion 43c connects the support member 43 to the drive beam 42.

By the above-described configuration, the vibration angular velocity sensor having a pair of angular velocity detection structures, in which two outer drive weights 31, 32 and two inner drive weights 33, 34, and two detection weights 35, 36 are provided, is formed. In the vibration angular velocity sensor formed as described above, the unnecessary vibration mode form can be restricted based on the width of the drive beams (the thickness in the Y-axis direction) and the width of the rotation beams 43a (the thickness in the Y-axis direction). The reason for such effect will be described later in detail.

Subsequently, an operation of the vibration angular velocity sensor having the above-described structure will be described with reference to FIG. 2 to FIG. 4.

Figure 2:
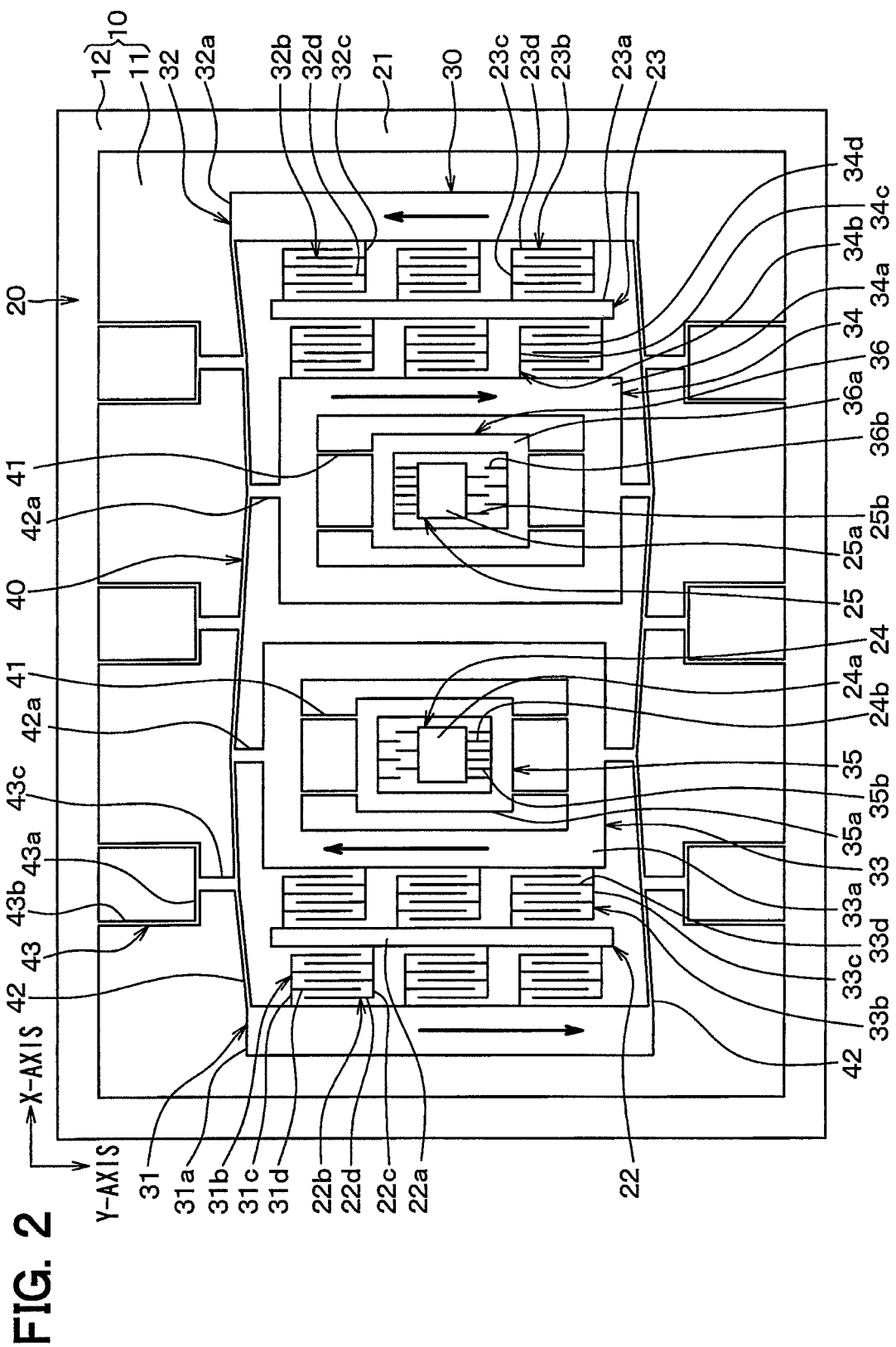
FIG. 2 is a diagram illustrating a state where the vibration angular velocity sensor is in a basic operation.

FIG. 2 is a diagram illustrating a state where the vibration angular velocity sensor is in a basic operation. When a potential difference is generated between the outer drive weights 31, 32 and the inner drive weights 33, 34 by applying AC voltage to the drive fixed portions 22, 23, an electrostatic force is generated in the Y-axis direction based on the potential difference. Based on the electrostatic force, each of the drive weights 31-34 are vibrated in the Y-axis direction. At this time, the vibration of each of the drive weights 31-34 in the Y-axis direction is monitored while changing the frequency of the AC voltage so that the frequency of the AC voltage becomes the drive resonance frequency fd. For example, electrodes for monitoring are disposed opposite to the outer drive weights 31, 32, and the displacements of the outer drive weights 31, 32 are detected based on changes of capacities formed therebetween. At this time, by the circuit processing, the frequency in a state where the capacity change is large is detected as the drive resonance frequency fd. The drive resonance frequency fd depends on the structure of the vibrator such as the width of the drive beams 42. When the drive resonance frequency fd is set to be several kHz to several tens of kHz, especially, from 5 kHz to 10 kHz, the sensitivity of the vibration angular sensor can be improved.

At this time, as illustrated in FIG. 2, the outer drive weight 31 and the inner drive weight 33 are vibrated in opposite directions in the Y-axis direction due to the arrangement of the drive fixed electrode 22b provided to the drive fixed portion 22, the drive movable electrode 31b provided to the outer drive weight 31, and the drive movable electrode 33b provided to the inner drive weight 33. In addition, as illustrated in FIG. 2, the outer drive weight 32 and the inner drive weight 34 are vibrated in opposite directions in the Y-axis direction due to the arrangement of the drive fixed electrode 23b provided to the drive fixed portion 23, the drive movable electrode 32b provided to the outer drive weight 32, and the drive movable electrode 32b provided to the inner drive weight 34. Furthermore, the two inner drive weights 33, 34 are vibrated in opposite phases in the Y-axis direction. Accordingly, the vibration angular velocity sensor is driven in the drive mode form.

At this time, the waving of the drive beams 42 in the S-shape allows each of the weight portions 31-34 to move in the Y-axis direction. However, the connection portions 43c connecting the rotation beams 43a and the drive beams 42 hardly displace.

Figure 3:
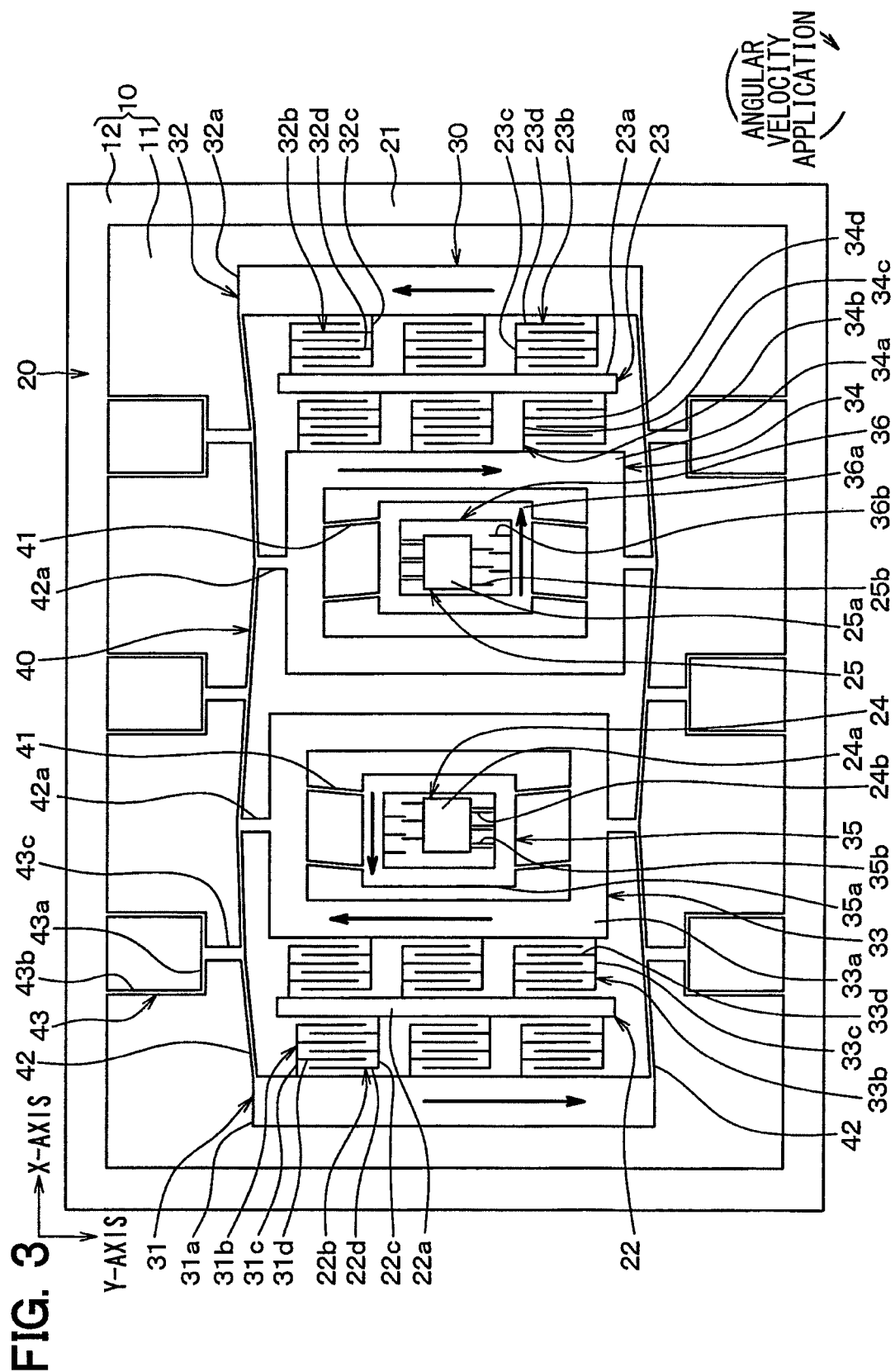
FIG. 3 is a diagram illustrating a state where the vibration angular velocity sensor is applied with an angular velocity.

FIG. 3 is a diagram illustrating a state where the vibration angular velocity sensor is applied with an angular velocity. When the vibration angular velocity sensor is applied to the vibration angular velocity sensor around the Z-axis, when the angular velocity sensor is in the basic operation as illustrated in FIG. 2, the detection weights 35, 36 displace in the X-axis direction due to a Coriolis force. Due to the displacement, the capacitance value of the capacitor formed by the detection movable electrode 35b of the detection weight 35 and the detection fixed electrode 24b of the detection fixed portion 24 and the capacitance value of the capacitor formed by the detection movable electrode 36b of the detection weight 36 and the detection fixed electrode 25b of the detection fixed portion 25 change. Thus, the angular velocity can be detected by the changes of the capacitance values of the capacitors based on signals extracted from the bonding pads of the detection fixed portions 24, 25. For example, in the configuration as the present embodiment, the changes of the capacitance values of the capacitors can be read by differentially amplifying the signals extracted from each of the two angular velocity detection structures. Thus, the angular velocity can be detected more certainly.

Figure 4:
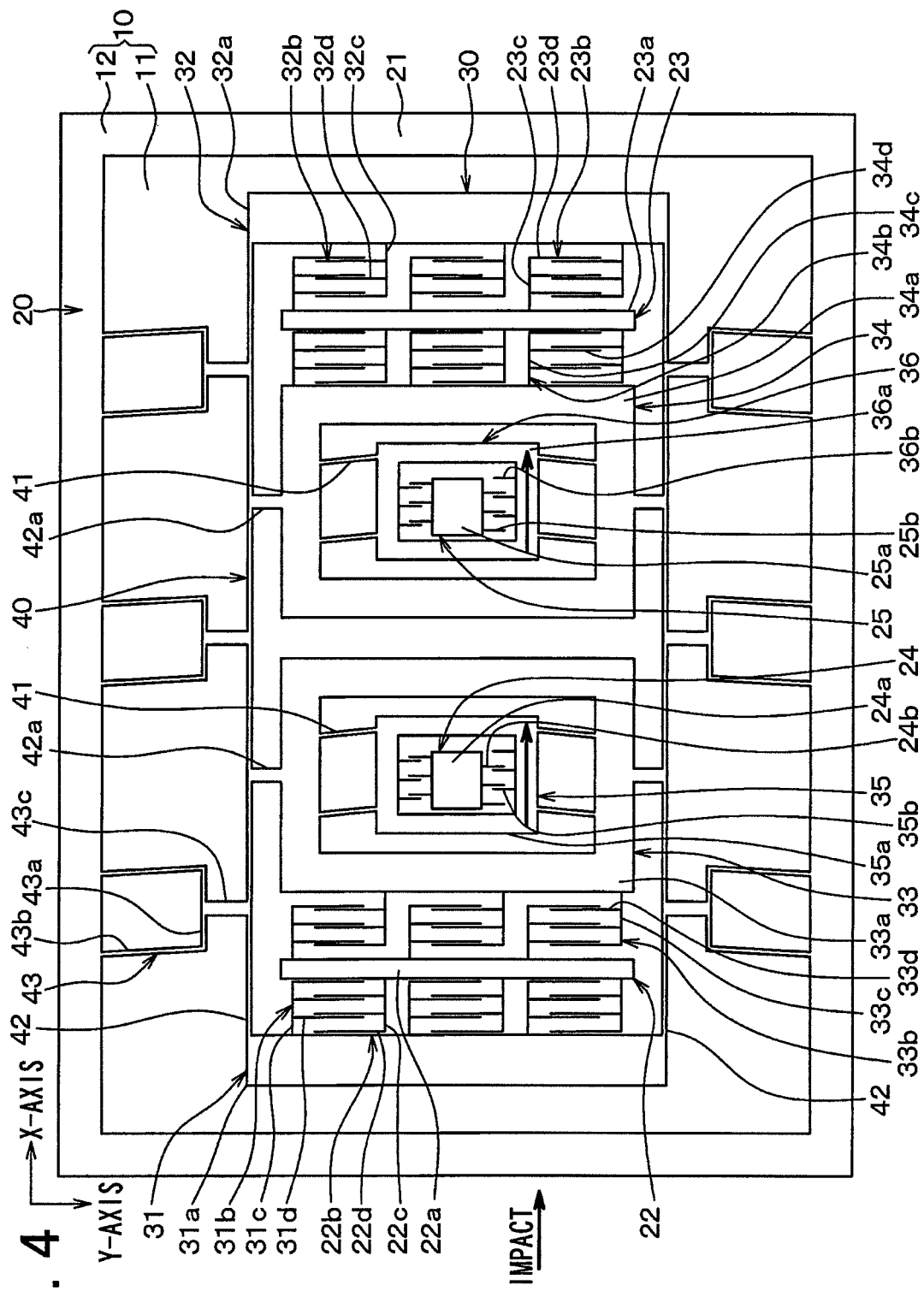
FIG. 4 is a diagram illustrating a state where the vibration angular velocity sensor is applied with an impact.

FIG. 4 is a diagram illustrating a state where the vibration angular velocity sensor is applied with an impact. As illustrated in FIG. 4, when an impact is applied from a left side of the paper surface, the support beams 43b and the detection beams 41 deform, each of the drive weights 31-34 displaces in the horizontal direction on the paper surface, and the detection weights 35, 36 also move in the horizontal direction of the paper surface along with the drive weights 31-34. Thus, even when each of the weight portions 31-36 and the beam section 40 are slightly different from ideal states due to, for example, working variations, a synchronized movement is realized. Thus, the vibration angular velocity sensor can have an effect that the difference of the changes of the detection capacitance values due to the displacements of the two detection weights 35, 36 is less likely to be generated and can improve the impact resistance.

In the vibration angular velocity sensor according to the present embodiment, as described above, the unnecessary vibration mode form is restricted based on the width (the thickness in the Y-axis direction) of the drive beams 42 and the width (the thickness in the Y-axis direction) of the rotation beams 43a. The reason for such effect will be described.

The inventors conducted various investigations about the vibration angular velocity sensor and found that the difference Δfr between the drive resonance frequency fd and the unnecessary mode frequency fr depends on a ratio (hereafter, referred to as a beam width ratio) R of the width of the rotation beams 43a in the support members 43 to the width of the drive beams 42. The mechanism will be described below.

Figure 5:
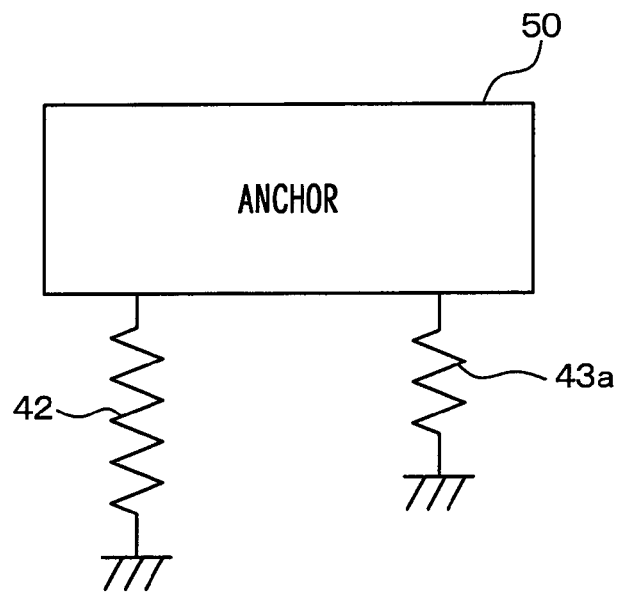
FIG. 5 is a simplified model diagram of the vibration angular velocity sensor.
Figure 9:
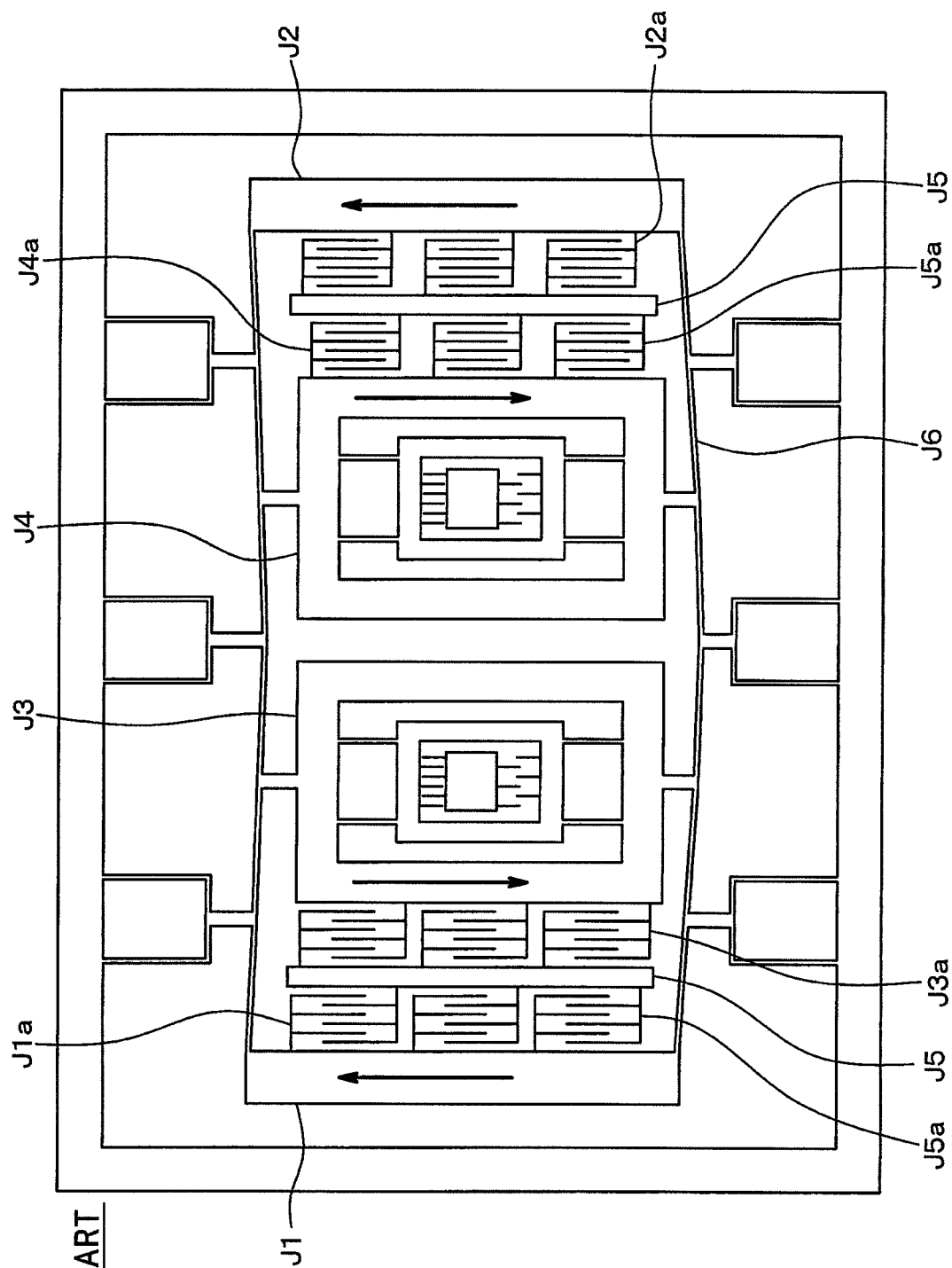
FIG. 9 is a diagram illustrating a state of the angular velocity sensor with the unnecessary vibration mode form according to the related art.
Figure 10A:
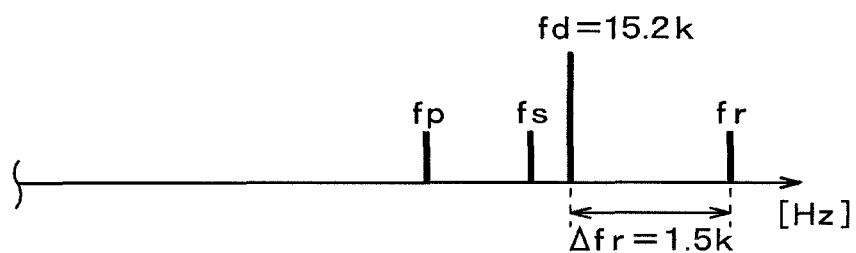
FIG. 10A is a diagram illustrating a frequency property of an angular velocity sensor having a conventional pattern shape.
Figure 10B:
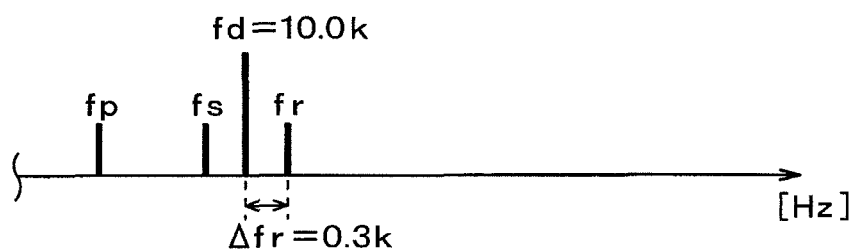
FIG. 10B is a diagram illustrating a frequency property of an angular velocity sensor having a pattern shape in which a width of a drive beam is decreased.

When the vibration model of the vibration angular velocity sensor is simplified taking a view of the basic operation time illustrated in FIG. 2 and the unnecessary vibration mode time illustrated in FIG. 9, the vibration model can be expressed by a simplified model diagram as illustrated in FIG. 5. In other words, the vibration model can be expressed by the simplified model in which the movable section 30 is regarded as a weight 50 having a mass M, and the weight 50 is supported by the drive beam 42 and the rotation beam 43a.

When $\alpha$ ($\alpha_{d1}$, $\alpha_{d2}$) is set to a coefficient, E is set to as a Young's modulus, I ($I_1$, $I_2$) is set as a second moment of area, and L ($L_1$, $L_2$) is set as a beam length, a spring constant k ($k_{d1}$, $k_{d2}$, $k_{r1}$, $k_{r2}$) of the drive beam 42 and the rotation beam 43a in each of the basic operation time and the unnecessary vibration mode time can be summarized as the following table.

TABLE 1

|  | Basic Operation Time | Unnecessary Vibration Mode Time |
|---|---|---|
| Drive Beam | $k_{d1} = \alpha_{d1}EI_1/L_1^3$ | $k_{r1} = \alpha_{r1}EI_1/L_1^3$ |
| Rotation Beam | $k_{d2} = \alpha_{d2}EI_2/L_2^3$ | $k_{r2} = \alpha_{r2}EI_2/L_2^3$ |

Then, the frequencies in the basic operation time and the unnecessary vibration mode time, that is, the drive resonance frequency fd and the unnecessary mode frequency fr can be expressed by the following equations.

$$(2\pi f_d)^2 = (k_{d1}+k_{d2})/M \quad \text{[Math. 1]}$$

$$(2\pi f_r)^2 = (k_{r1}+k_{r2})/M \quad \text{[Math. 2]}$$

When the width of the drive beams 42 is set to h1, the width of the rotation beams 43a is set to h2, and the ratio h2/h1 is set to the beam width ratio R, a relationship of the drive resonance frequency fd and the unnecessary mode frequency fr can be expressed by the following equation.

$$\left(\frac{f_r}{f_d}\right)^2 = \frac{k_{r1}+k_{r2}}{k_{d1}+k_{d2}} = \frac{\frac{\alpha_{r1}}{L_1^3}+\frac{\alpha_{r2}}{L_2^3}\cdot R^3}{\frac{\alpha_{d1}}{L_1^3}+\frac{\alpha_{d2}}{L_2^3}\cdot R^3} \quad \text{[Math. 3]}$$

From this equation, it is understood that the frequency ratio fr/fd of the drive resonance frequency fd and the unnecessary mode frequency fr is expressed as a function of the beam width ratio R of the drive beam 42 and the rotation beam 43a. Because the frequency ratio fr/fd is expressed as the function of the beam width ratio R of the drive beam 42 and the rotation beam 43a, a mechanism in which the frequency ratio fr/fd is changed by changing the beam width ratio R is obtained.

When actual analysis is carried out to the beam width ratio R, the frequency ratio fr/fd, and the like based on such knowledge, the following result is obtained. The following describes about this with reference to FIG. 6 and FIG. 7.

Figure 6:
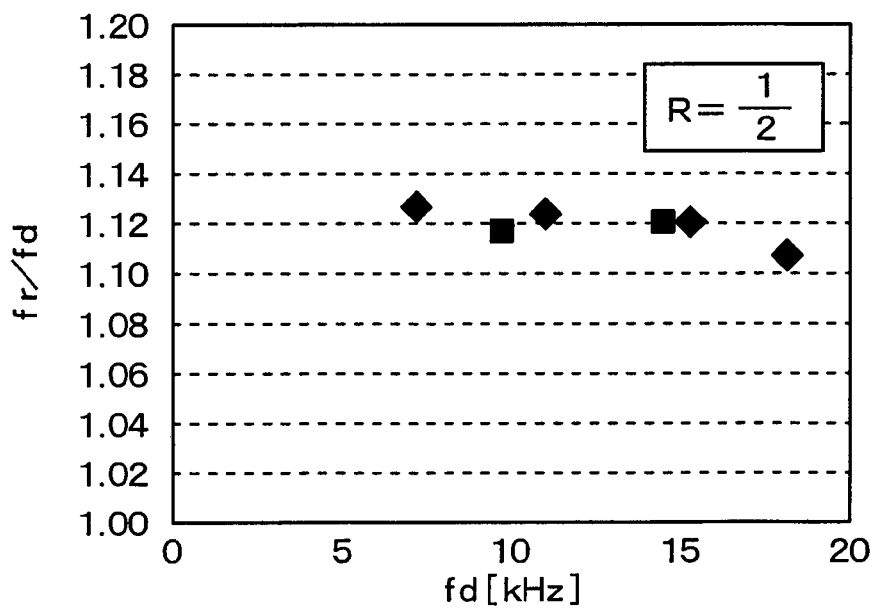
FIG. 6 is a graph illustrating an actual analysis example of a relationship between the drive resonance frequency fd and a frequency ratio fr/fd in a case where a beam width ratio R is fixed at ½.

As illustrated in FIG. 6, it is confirmed that, even when the drive resonance frequency fd is changed by changing the drive beams 42 and the rotation beams 43, if 1/R is constant, that is, if the beam width ratio R is constant, the frequency ratio fr/fd is almost constant. Here, 1/R is set to ½ and fr/fd becomes about 1.12. Thus, the frequency difference Δfr between the drive resonance frequency fd and the unnecessary frequency fr is about 12% of the drive resonance frequency fd. When the frequency difference Δfr is greater than or equal to 10%, there is no possibility that the unnecessary mode frequency fr is erroneously detected as the drive resonance frequency and a malfunction is caused. Thus, it is understood that a malfunction can be sufficiently prevented at least on condition of 1/R=2.

Figure 7:
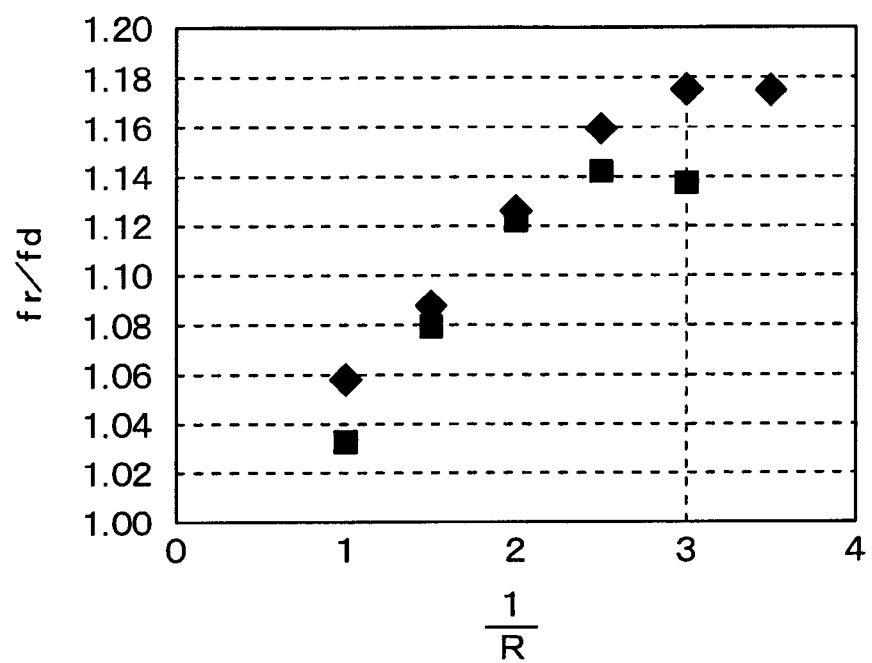
FIG. 7 is a graph illustrating an actual analysis example of a relationship between 1/R and the frequency ratio fr/fd.
Figure 8:
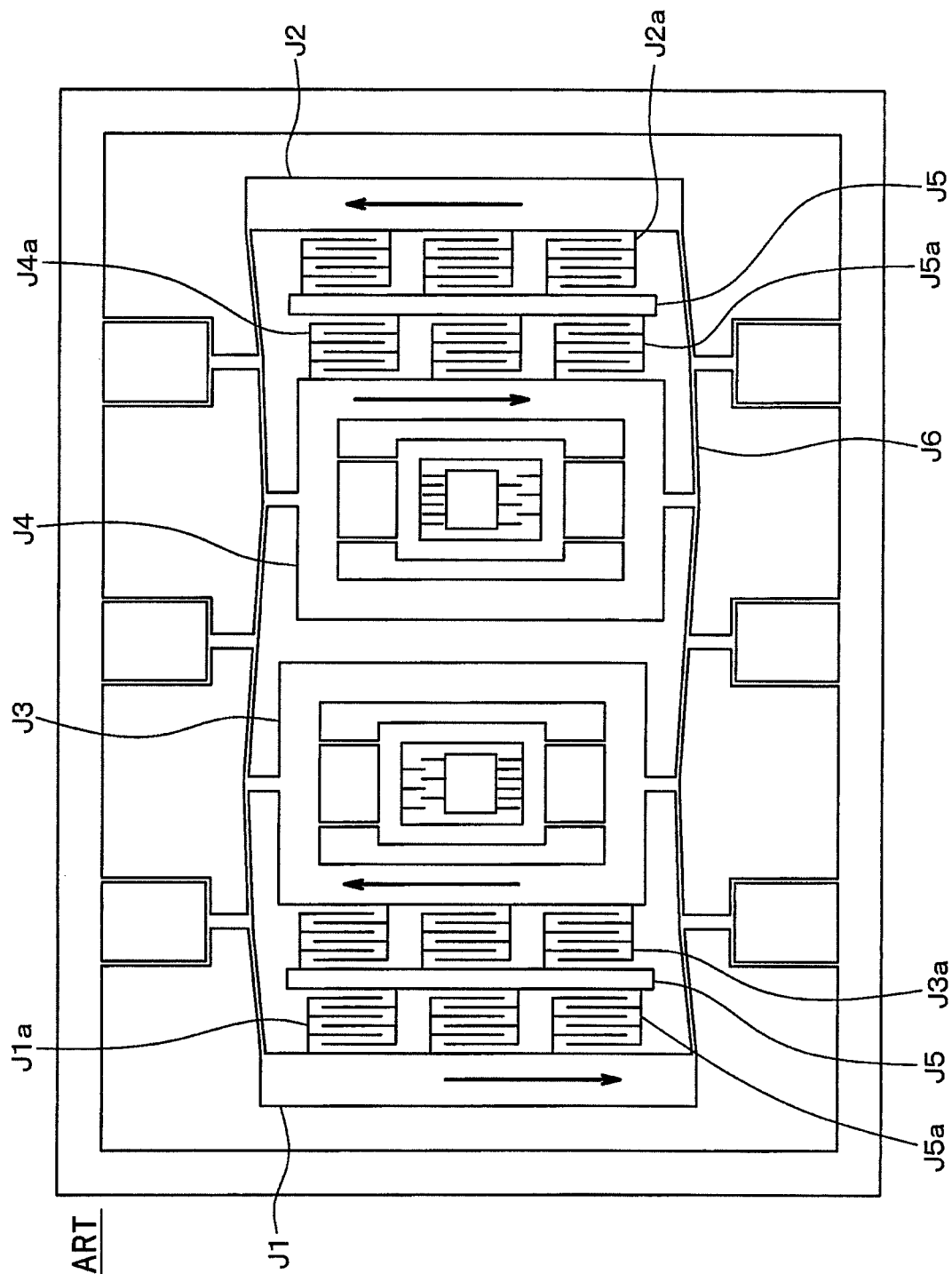
FIG. 8 is a diagram illustrating a state of an angular velocity sensor with a drive mode form according to a related art.

On the other hand, as illustrated in FIG. 7, it is confirmed that the frequency ratio fr/fd changes with 1/R. Specifically, the frequency ratio fr/fd increases with increase of 1/R. This means that the frequency difference Δfr between the drive resonance frequency fd and the unnecessary mode frequency fr increases with increase of 1/R. Thus, it is possible to increase the frequency difference Δfr by setting 1/R to be greater than or equal to 1 and setting the spring property of the drive beam 42 to be larger than the spring property of the rotation beam 43a. Especially, when the frequency difference Δfr is greater than or equal to 10%, the unnecessary mode frequency fr is not erroneously detected as the drive resonance frequency fd, and a malfunction is not caused. From FIG. 7, it can be understood that when 1/R is greater than or equal to 2, the frequency difference Δfr is greater than or equal to 10% and a malfunction can be prevented, and when 1/R is greater than or equal to 3, the frequency difference Δfr is greater than or equal to 20% and a malfunction can be prevented more certainly.

In addition, it can be understood that although the frequency difference Δfr increases with increase of 1/R, the frequency difference Δfr increases little when 1/R become large some degree and the frequency difference Δfr is inclined to be saturated. Thus, when 1/R is about 3, almost the maximum frequency difference Δfr can be obtained.

As described above, the vibration angular velocity sensor has a structure in which the weight portions 31-36 are connected by the drive beams 42 having the linear shapes, the weight portions 31-36 are vibrated by the bending of the drive beams 42, and the vibrator is fixed to the fixed section 20 at the points (the fixed points) of the drive beams 42 through the support members 43. In this structure, the spring property of the support members 43, specifically, the spring property of the rotation beams 43a provided to the support members 43 is set to be smaller than the spring property of the drive beams 42. Accordingly, the unnecessary mode frequency fr is restricted from being detected as the drive resonance frequency fd, and a malfunction can be restricted. Especially, when 1/R is greater than or equal to 2, because the frequency difference Δfr is greater than or equal to 10%, a malfunction can be prevented more, and when 1/R is greater than or equal to 3, because the frequency difference Δfr is greater than or equal to 20%, a malfunction can be prevented more certainly.

Other Embodiments

In the above-described embodiment, the case in which an SOI substrate is used as the substrate 10 has been described. However, this shows one example of the substrate 10, and a substrate other than an SOI substrate may also be used.

In the above-described embodiment, one example of the structure of the vibration angular velocity sensor has been described. However, the design of the vibration angular velocity sensor can be changed appropriately. In other words, each of the weight portions 31-36 and each of the portions in the fixed section 20 may have any structure as long as the weight portions 31-36 are connected by the linear drive beams 42, the weight portions 31-36 are vibrated by the bending of the drive beams 42, and the vibrator is fixed to the fixed section 20 at the points (the fixed points) of the drive beams 42 through the support members 43.

The invention claimed is:
1. A vibration angular velocity sensor comprising:
a substrate;
a vibrator including support members, linear drive beams, and a plurality of weight portions connected by the drive beams, the vibrator vibrating the plurality of weight portions by bending of the drive beams, the vibrator fixed to the substrate through the support members at fixed points of the drive beams;
detection fixed portions formed to one surface side of the substrate and having detection fixed electrodes fixed to the substrate;
detection weights including detection movable electrodes disposed opposite to the detection fixed electrodes and mass portions to which the movable electrodes are provided;

a pair of inner drive weights surrounding the detection weights and connected with the detection weights through detection beams;

a pair of outer drive weights disposed to both sides sandwiching the pair of inner drive weights; and drive fixed portions generating electrostatic attraction forces that vibrate the inner drive weights and the outer drive weights in opposite directions to each other, wherein the outer drive weights and the inner drive weights connected with the detection weights form the plurality of weight portions, the drive beams connect the inner drive weights and the outer drive weights, the support members support the inner drive weights connected with the outer drive weights and the detection weights to the substrate at the fixed points of the drive beams, a sensor driving that vibrates the outer drive weights and the inner drive weights is performed by bending the drive beams based on the electrostatic attraction forces generated by the drive fixed portions, when an angular velocity is applied during the sensor driving, the detection weights are moved in a direction perpendicular to a vibration direction of the inner drive weights by bending of the detection beams, and the angular velocity is detected based on changes of capacitances of the detection fixed electrodes and the detection movable electrodes, the support members include rotation beams that wave and bend during the sensor driving, support beams that support both ends of the rotation beams to the substrate, and connection portions that connect the rotation beams and the drive beams at the fixed points of the drive beams, when a beam width ratio of a width h2 of the rotation beams to a width h1 of the drive beams in the vibration direction of the outer drive weights and the inner drive weights is expressed by R, 1/R is set to be greater than or equal to 1, the pair of inner drive weights are vibrated with opposite phases with a drive resonance frequency fd in a drive mode, the pair of inner drive weights are vibrated with same phase with an undesirable mode frequency fr in an undesirable vibration mode, the undesirable mode frequency fr is higher than the drive resonance frequency fd, and a frequency difference Δfr between the drive resonance frequency fd and the unnecessary mode frequency fr is greater than or equal to 10%.

2. The vibration angular velocity sensor according to claim 1, wherein

1/R is set to be greater than or equal to 2.

3. The vibration angular velocity sensor according to claim 2, wherein

1/R is set to be greater than or equal to 3.

4. The vibration angular velocity sensor according to claim 1, wherein the sensor driving is performed when an alternating-current voltage is applied between the drive fixed portions and the inner drive weights and the outer drive weights, a frequency of the alternating-current voltage is set to be a drive resonance frequency fd, and the drive resonance frequency fd is set to be several kHz to several tens of kHz.

5. The vibration angular velocity sensor according to claim 4, wherein the drive resonance frequency fd is set to be 5 kHz to 10 kHz.

6. The vibration angular velocity sensor according to claim 1, wherein one of the outer drive weights, one of the inner drive weights, the other of the inner drive weights, and the other of the outer drive weights are arranged in order and are connected by the drive beams, and the support members connect the substrate and the drive beams at positions between the one of the outer drive weights and the one of the inner drive weights, between one of the inner drive weights and the other of the inner drive weights, and between the other of the inner drive weights and the other of the outer drive weights.

* * * * *